(No Model.)

J. W. WINDLE.
FOUR WHEELED VEHICLE.

No. 587,628. Patented Aug. 3, 1897.

Witnesses:
John Grist
H. S. Horsey

Inventor:
John W. Windle
By Harry Grist
Attorney.

UNITED STATES PATENT OFFICE.

JOHN W. WINDLE, OF ORMSTOWN, CANADA.

FOUR-WHEELED VEHICLE.

SPECIFICATION forming part of Letters Patent No. 587,628, dated August 3, 1897.

Application filed October 26, 1896. Serial No. 610,038. (No model.)

*To all whom it may concern:*

Be it known that I, JOHN W. WINDLE, of Ormstown, in the Province of Quebec and Dominion of Canada, have invented a certain new and useful Improvement in Four-Wheeled Vehicles, of which the following is a full, clear, and exact description.

I will describe a vehicle embodying my invention, and then point out the novel features in the appended claims.

Reference is to be had to the accompanying drawings, forming a part of this specification, in which similar characters of reference indicate corresponding parts in all the views.

Figure 1:
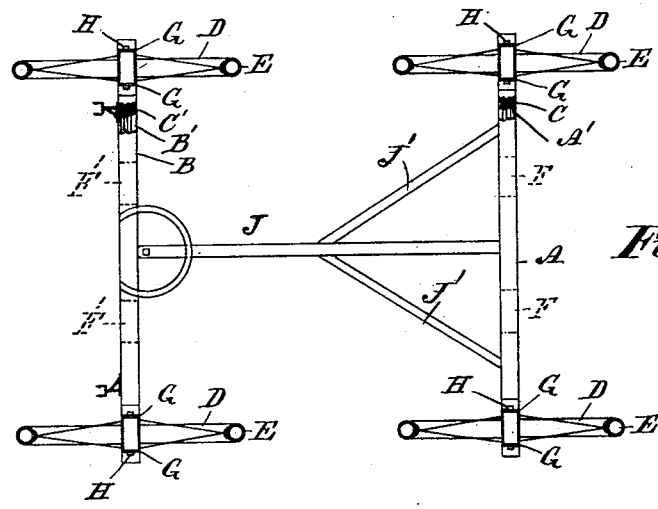
Figure 2:
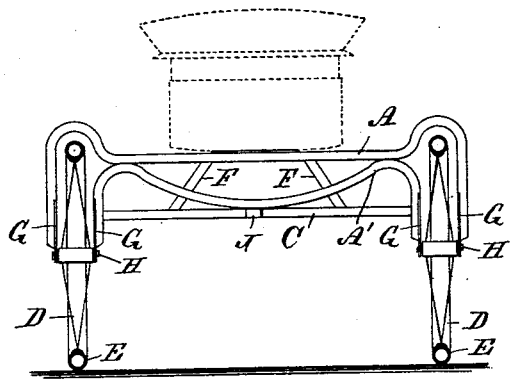

Figure 1 is a plan view and partial section of a vehicle embodying my invenion with a portion broken away to more clearly show other parts. Fig. 2 is a rear elevation with the vehicle-body shown in dotted lines, and Fig. 3 shows a modification.

Referring to the drawings, A designates the rear bolster-bar, having its ends curved upward and then downward, and connected to the bolster-bar, as shown in Fig. 2, is a brace-bar A', having downwardly-turned ends parallel with the downwardly-turned ends of the bar A. Secured to the downwardly-turned ends of the two bars are metal plates G, forming bearings for the axles H of the wheels D, which, as here shown, are provided with pnuematic tires E. Preferably the downwardly-turned portions of the brace-bar A' will be connected by a strut C, which will prevent the parts from spreading under pressure, and as an additional strengthening means I employ braces F, diagonally disposed between the bolster-bar A and the strut C.

The front wheels D are supported in a bolster-bar B, a brace-bar B', and a truss C' and braces F'. These parts are similar to the parts heretofore described, and the trusses C C' are connected together by means of a reach J, having braces J', extended from it to the rear truss C, but this reach may be omitted, as the body of the vehicle may serve the purpose of a reach.

Figure 3:
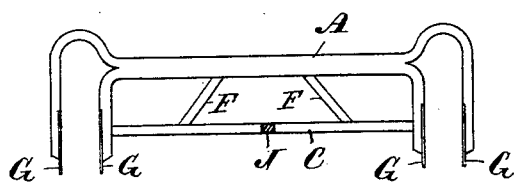

In Fig. 3 I have omitted the brace-bar $A^2$ and provided the bolster with bifurcated ends, but it is to be understood that in both examples of my improvement there is in effect a bolster having bifurcated ends to embrace each pair of wheels.

It will be seen in my construction that the bottom of the vehicle-body is below the top plane of the wheels. This is owing to the upward curve of the bolsters and is a desirable feature in a four-wheeled vehicle. I am aware that sulkies have been patented in which an arched cross-bar is employed, but in such a sulky the cross-bar supports the body or seat considerably above the plane of the wheels, and such construction I do not claim.

Having thus described my invention, I claim as new and desire to secure by Letters Patent—

1. A four-wheeled vehicle, comprising front and rear wheels, truss-bars for the pairs of wheels, the said truss-bars being curved upward and then downward and having bearings for the wheel-axles, and a body supported on the truss-bars, the bottom of said body being below the top plane of the wheels, substantially as specified.

2. A four-wheeled vehicle, comprising bolster-bars having ends turned upward and then downward, truss-bars connecting downwardly-turned portions, wheels having axle-bearings in the downwardly-turned portions, and a body having its bottom below the plane of the upwardly-turned portions of the bolsters, substantially as specified.

JOHN W. WINDLE.

Witnesses:
JOHN GRIST,
HENRY GRIST.